United States Patent [19]
Nicol et al.

[11] Patent Number: 5,196,111
[45] Date of Patent: Mar. 23, 1993

[54] REACTOR FOR THE BIOLOGICAL TREATMENT OF SEWAGE

[75] Inventors: Roger Nicol, Issy-les-Moulineaux; Vincent Savall, Villacoublay, both of France

[73] Assignee: Degremont, Rueil-Malmaison, France

[21] Appl. No.: 763,535

[22] Filed: Sep. 23, 1991

[30] Foreign Application Priority Data

Sep. 25, 1990 [FR] France ............................... 90 11804

[51] Int. Cl.⁵ ............................................. C02F 3/30
[52] U.S. Cl. ............................... 210/96.1; 210/195.1; 210/202; 210/259; 210/605; 210/903
[58] Field of Search .................. 210/195.1, 195.3, 202, 210/220, 259, 605, 614, 630, 903, 96.1, 143

[56] References Cited

U.S. PATENT DOCUMENTS

| | | | |
|---|---|---|---|
| 3,953,327 | 4/1976 | Parker | 210/903 |
| 3,964,998 | 6/1976 | Barnard | 210/903 |
| 3,994,802 | 11/1976 | Casey et al. | 210/903 |
| 4,271,026 | 6/1981 | Chen et al. | 210/903 |
| 4,548,715 | 10/1985 | Stein | 210/614 |

FOREIGN PATENT DOCUMENTS

| | | |
|---|---|---|
| 396057 | 11/1990 | European Pat. Off. |
| 63-294995 | 12/1988 | Japan |
| 8000300 | 8/1981 | Netherlands |

Primary Examiner—Stanley S. Silverman
Assistant Examiner—Christopher Upton
Attorney, Agent, or Firm—Pollock, VandeSande & Priddy

[57] ABSTRACT

Improved reactor for the biological treatment of sewage, intended to replace the aeration tank in plants comprising an anaerobic tank in which denitrification takes place, an anaeration tank where the nitrification of the effluents by aerobic bacteria is carried out and a final clarifier, which comprises a single tank having three separate zones which are, in the order in which the liquid to be treated passes through them successively:
an aeration operating with plug flow;
an anaerobic zone; and
a completely mixed zone comprising means permitting it to operate under adjustable aeration conditions.

5 Claims, 2 Drawing Sheets

REACTOR FOR THE BIOLOGICAL TREATMENT OF SEWAGE

The present invention relates to an improved reactor for the biological treatment of sewage.

It is known that in the course of the biological treatment of sewage a biological nitrification is performed in particular, that is to say a conversion into nitrates of the nitrogen compounds present in the effluent to be treated, enabling the oxygen demand of the effluent to be considerably reduced before it is discharged into the natural environment. This treatment also includes a biological denitrification stage which additionally permits the destruction of nitrates and the removal of nitrogen in gas form.

The nitrification is performed by oxygen-consuming aerobic bacteria and is usually carried out in a tank called an "aeration tank". The denitrification is ensured by bacteria which, for their part, consume the oxygen of the nitrates in the absence of oxygen, that is to say under anaerobic conditions, in a tank called an "anaerobic tank".

Given that the water returned to the natural environment (via a final clarifier which frees it of excess sludge) must contain oxygen, the anaerobic tank must be placed upstream of the aeration tank. A very considerable recycling towards this anaerobic tank is ensured, from the aeration tank to ensure the denitrification of the nitrates formed in this aeration tank, and from the final clarifier, with a view to denitrification and also to supply the necessary biological mass.

An example of embodiment of such a conventional plant is shown diagrammatically in FIG. 1 of the attached drawings, this figure being given merely to facilitate comparison with a plant employing the reactor forming the subject matter of the invention, which will be described below.

This FIG. 1 shows at 10 the anaerobic tank in which the denitrification takes place, at 12 the aeration tank in which the nitrification takes place and, finally, at 14 the final clarifier. R1 and R2 represent diagrammatically the recycles towards the anaerobic tank 10 which are performed from the aeration tank 12 and from the clarifier 14 respectively, as mentioned above.

In these plants of the known type, the aeration tanks such as 12 can be either of the type known in chemical engineering parlance under the term of "plug flow" or of the type called "completely mixed".

The first type of aeration tank ensures a high yield, since it operates like a series of reactors, and a good sludge settleability. On the other hand, an aeration tank of this type does not make it possible to cope with large variations in flow rates and/or pollution and it consumes a very high stirring energy.

The second type of aeration tank ensures an efficient stirring with a lesser energy consumption but, given that the water characteristics are the same at all points in the tank, the purification yield is mediocre. Furthermore, it prohibits any commencement of denitrification (which would favor the general economy of the system) because there is always an excess of oxygen needed for the nitrification. Finally, an aeration tank of this type, like the first type described above, is sensitive to variations in flow rate and in the characteristics of the liquid to be treated. This latter disadvantage, common to both types of aeration tanks, has the unfavorable consequence of making the aeration tank very large in volume (much larger than that demanded merely by the aeration requirements), to absorb the variations in flow rate or pollution which are very frequent in the field of sewage treatment. This has a second result, not less unfavorable: in fact, the nitrate concentration is low at the end of the aeration tank and, in order to treat these nitrates, it is therefore necessary to accept high recycles towards the anaerobic tank which must consequently itself be very large in volume.

The present invention proposes to provide an improved reactor which does not exhibit the disadvantages of the plants of a known type as described above.

The subject of this invention is therefore an improved reactor for the biological treatment of sewage, intended to replace the aeration tank in plants comprising an anaerobic tank in which the denitrification takes place, an aeration tank where the nitrification of the effluents by aerobic bacteria is carried out and a final clarifier, characterized in that it consists of a single tank comprising three separate zones which are, in the order in which the liquid to be treated passes through them successively:

an aeration zone operating with plug flow;
an anaerobic zone; and
a completely mixed zone comprising means permitting it to operate under adjustable aeration conditions.

According to a characteristic of the present invention, the overall volume of the reactor is a function of the quantity of biological sludge produced, of the oxygen demand of the liquid to be treated and of the temperature.

According to the invention, the volume of the plug flow zone is a function of the flow of nitrogen ($NH_4$) to be nitrified and of the temperature, that of the anaerobic zone is a function of the free oxygen resulting from the quantity of oxygen to be transferred into the plug flow zone to oxidize the ammonium ion and that of the completely mixed zone corresponds to the nitrate concentration and to the maintenance of a sufficient redox potential.

According to the invention, the overall residence time of the effluent in the reactor is of the order of 6 to 15 hours.

According to an embodiment of the reactor forming the subject of the invention, the aeration zone operating with plug flow represents from 40 to 70% of the total volume of the reactor, the anaerobic zone represents from 2 to 10% of this volume and the completely mixed zone from 20 to 60% of this total volume.

According to an example of embodiment, the reactor takes the form of a tank comprising partitions defining the three zones:

the aeration zone operating with plug flow, comprising means of air supply enabling a dissolved oxygen content higher than 2 mg per liter to be maintained by aeration;

the anaerobic zone, arranged following the aeration zone, which is provided with means for stirring using air or using a mechanical stirring system for keeping the sludge in suspension, and which at its entry (that is to say at the exit of the aeration zone) comprises a conduit ensuring the recycling of the liquor towards the anaerobic tank which is situated at the head of the plant, upstream of the reactor;

the completely mixed zone, which is provided with circulators of a known type ensuring the stirring and the circulation of the flow in this zone and which is also provided with aerators and means for monitoring the redox potential by which the said aerators are servo-controlled. This zone is provided with an exit orifice opening into the conduit ensuring the transfer of the liquor towards the clarifier.

Other characteristics and advantages of the present invention will emerge from the description given below with reference to the attached drawings which illustrate an example of embodiment thereof, devoid of any limiting nature. In the drawings.

Figure 3:
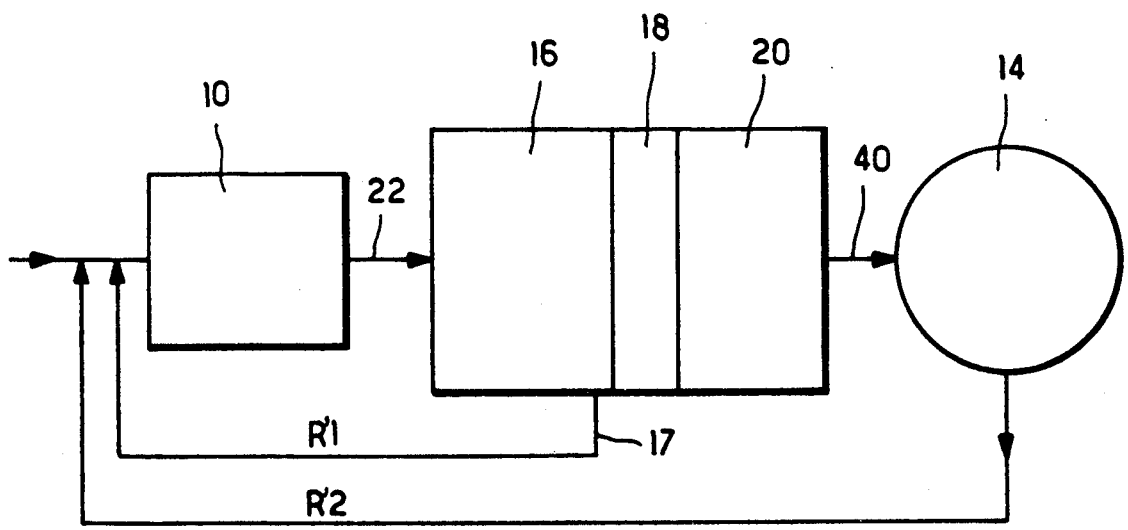
FIG. 3 is a diagram showing a plant in which the reactor according to FIG. 2 is used.

As can be seen in FIG. 3, the reactor according to the invention, denoted in its entirety by reference 11, is placed between an anaerobic reactor 10, similar to the reactor 10 of the conventional plant described above with reference to FIG. 1, and the clarifier 14.

Figure 2:
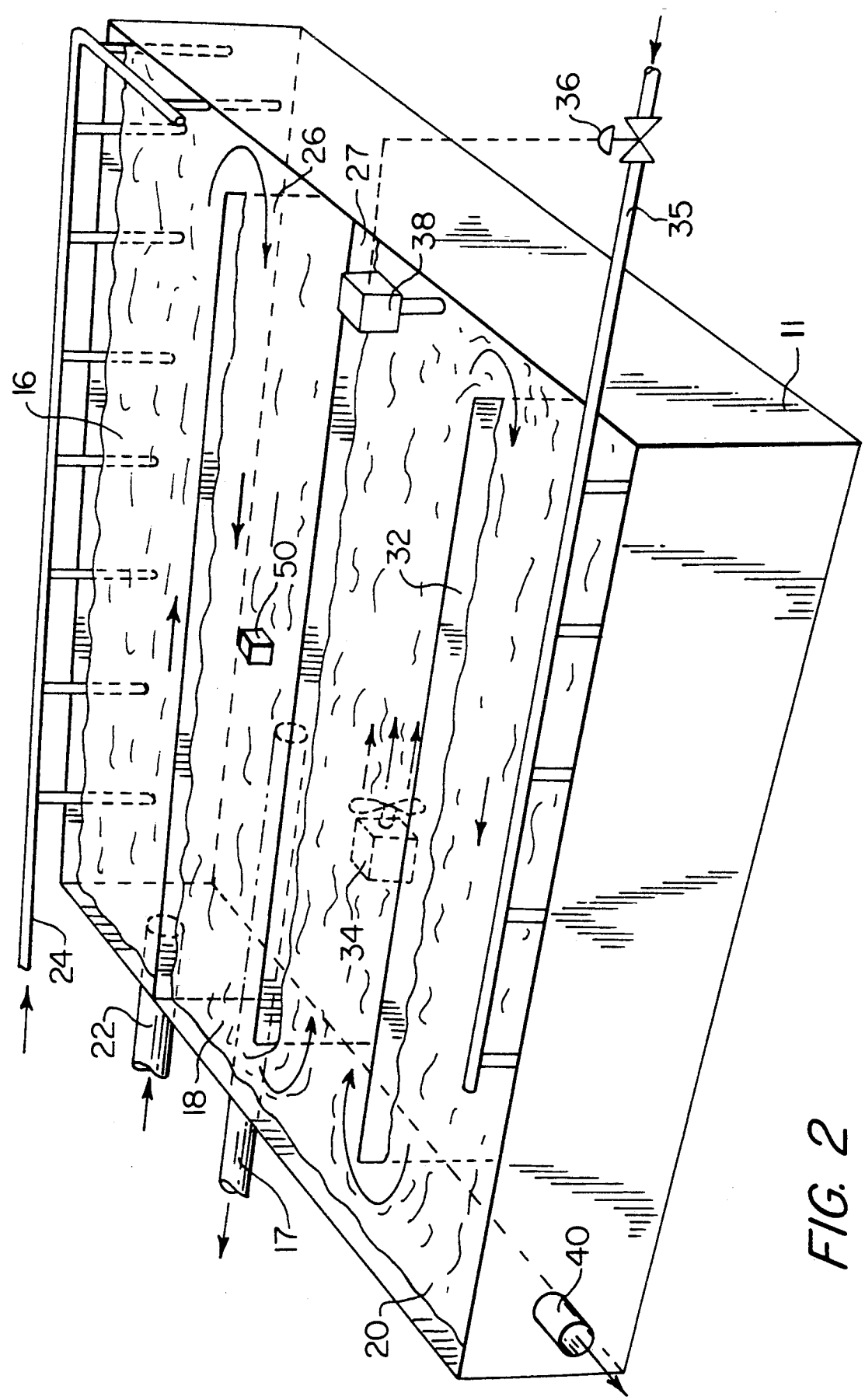
FIG. 2 shows diagrammatically and in perspective an embodiment of an improved reactor according to the invention.

As can be seen in FIG. 2, the reactor according to the present invention is in the form of a tank 11 in which partitions define the three successive zones:

the aeration zone 16 operating with plug flow;
the anaerobic zone 18; and
the completely mixed zone 20 operating under adjustable aeration conditions.

According to the invention, the overall volume of the reactor is a function of the quantity of biological sludge produced, of the oxygen demand and of the temperature.

The volume of the aeration zone 16 with plug flow is a function of the flow of nitrogen (NH$_4$) to be nitrified and of the temperature. According to the invention, this volume may represent from 40 to 70% of the total volume of the reactor.

The aeration zone 16 comprises the conduit 22 for the liquor entry into the reactor and is provided with means of air supply 24. As can be seen in the drawing, this aeration zone 16 comprises a transverse partition 26 enabling circulation to be performed therein over a longer path.

The purpose of this aeration zone 16 is to eliminate the biological oxygen demand (BOD) of the water originating from the anaerobic tank 10 situated upstream (FIG. 3), and introduced via the conduit 22, and to convert the ammoniacal nitrogen into nitrates by means of aerobic bacteria. Owing to the very fact that it operates with plug flow, the purification yield of this aeration zone is excellent. The result that this zone, the dimensions of which are calculated precisely for the use which is made of it, is very much smaller in volume than that of an aeration tank of a conventional type, such as the tank 12 of the known plant illustrated by FIG. 1 for instance the reduction in size can be of the order of 50% or even less, depending on the characteristics of the water to be treated, that is to say according to the safety margins which must be observed in relation to a conventional aeration tank.

As a result of this, therefore, the nitrate concentration of the mixed liquor, that is to say of the mixture of sewage being treated and of the biomass, leaving this aeration zone and partially recycled towards the anaerobic tank 10 (FIG. 3), is much greater than that of the mixed liquor produced at the end of the conventional aeration tank 12 of a plant of the known type, as described above with reference to FIG. 1.

It will be noted that, since the nitrifying bacteria are strictly aerobic, a dissolved oxygen content which is higher than 2 mg per liter is maintained in this zone 16 by aeration by virtue of the aeration system 24.

The purpose of the anaerobic zone 18 which is arranged following the aeration zone 16 with plug flow is to consume the residual dissolved oxygen present in the mixed liquor leaving the aeration zone 16, using merely the effect of the endogenic activity of the bacterial before the effluent enters the third zone 20 of the reactor, operating with complete mixing, where the oxygen would inhibit the denitrification operation. The anaerobic zone 18 includes means to produce a periodic stirring of the zone keeping the sludge in suspension. It is possible, of course, to provide any means of stirring such as, for example, mechanical stirrers 50. The liquor which is to be recycled into the anaerobic tank 10 situated at the head of the plant illustrated by FIG. 3 is withdrawn at the entry of this anaerobic zone 18, that is to say at the exit of the aeration zone. As can be seen in FIG. 2, this withdrawal is performed by means of a conduit 17.

The volume of this anaerobic zone 18 is a function of the free oxygen resulting from the quantity of oxygen to be transferred into the plug flow zone to oxidize the ammonium ion. According to the invention this volume may represent from 2 to 10% of the total volume of the reactor.

The last zone of the reactor according to the present invention is the completely mixed zone 20. This zone is separated from the anaerobic zone 18 by a transverse partition 27, it comprises a transverse partition 32 to ensure the circulation of the mixed liquor and is provided with circulators made, for example, in the form of recirculating propellers 34 (or any other known equivalent means) ensuring stirring and circulation of the flow in this zone 20 at a very high flow rate, of the order of 15 to 40 times the flow rate of the incoming mixed liquor. This zone is also provided with means of aeration represented diagrammatically in the drawing by the air supply conduit 35 fitted with an automatic valve 36 and means for monitoring the redox potential characterizing the oxygenation state of the effluent. In the embodiment shown in FIG. 2 these means are produced in the form of a probe 38 for monitoring the redox potential, by which the valve 36 is servo controlled. This zone 20 comprises a conduit 40 for the exit of liquor towards the clarifier 14 (FIG. 2).

The intense recirculation produced according to the invention in the completely mixed zone 20 makes it possible to ensure the denitrification in good conditions (complete mixing) of the oxygen-depleted effluent originating from the anaerobic zone 18. An advantageous consequence of this is a reduction in the charge, and hence in the dimensions, of the anaerobic tank 10 placed at the head of the plant (FIG. 3).

The control of the redox potential obtained by subjecting the automatic valve 36 for introducing air to servo control by the data supplied by the probe 38 makes it possible to:

maintain the zone in an anaerobic state, that is to say to avoid either an overoxygenation which is detrimental to denitrification, or stirring in an anaerobiotic state, which would alter the composition of the biomass in respect of aerobic and nitrifying bacteria which must be separated off during the final settling (in the clarifier 14) and which must be partially recycled to the head of the plant (see FIG. 3);

bring in additional oxygen (by using the air introduction system 34 or any other aeration system) to make this zone 20 occasionally operate aerobically and thus to complement the action of the first zone 16 of the reactor if an accidental large change in the characteristics of the liquid to be treated requires this addition.

By way of guidance, it can be said that, depending on circumstances, the overall residence time of the effluents in the reactor according to the invention varies from 6 to 15 hours.

Among the advantages provided by the three-zone reactor according to the invention, the following ones may be mentioned in particular:

a reduction in the volume devoted to aeration to that which is strictly necessary;

maintenance of the different oxygenation conditions required at each point of the reactor;

obtaining a satisfactory operation during accidental changes in flow rate or in pollution;

a reduction in the flow rate recycled ahead towards the anaerobic tank 10, both because the mixed liquor withdrawn from the exit of the aeration zone 16 of the reactor is much more concentrated in nitrifying bacteria than that originating from a conventional aeration tank (such as the tank 12 of the plant illustrated in FIG. 1) and because the third zone of the reactor (completely mixed zone 20) itself ensures part of the denitrification;

a reduction in volume of the anaerobic tank 10 situated at the head of the plant (see FIG. 3), which receives less nitrates and in a more concentrated form; and a compactness of the plant using the reactor of the invention.

The characteristics of two plants are given below, by way of nonlimiting examples:

one of a conventional type in accordance with that described above with reference to FIG. 1; and the other (FIG. 3) using a reactor according to the present invention, such as described above with reference to FIG. 2.

Figure 1:
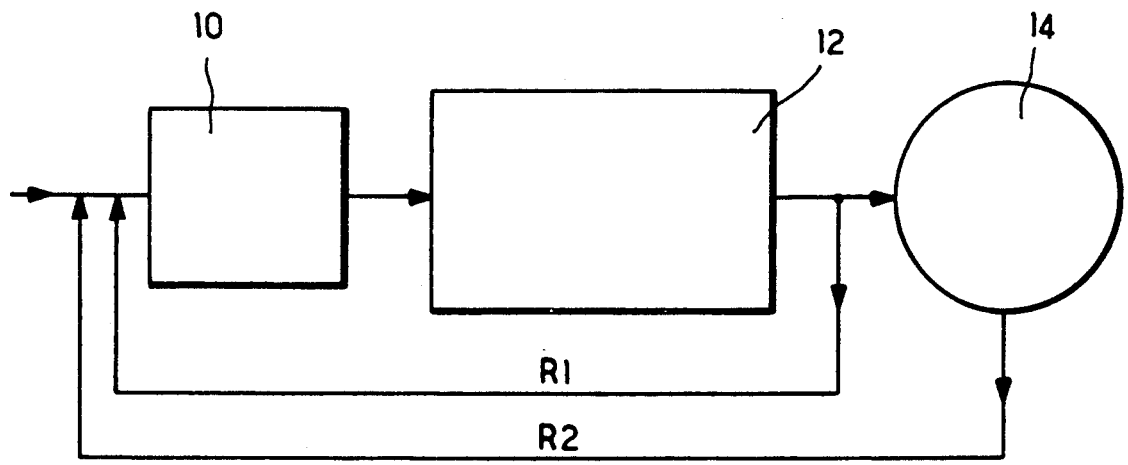
FIG. 1 shows the conventional plant described above.

In both these examples the operating conditions were identical, namely:

| Water to be treated: | |
| --- | --- |
| flow rate | 1,200 m³/h |
| BOD | 6,450 kg/d |
| nitrogen | 1,022 kg/d |
| Discharge standards: | |
| BOD | 20 mg/l |
| nitrogen | 5 mg/l |
| nitrates | 5 mg/l (expressed as combined nitrogen in nitrates). | the plants must therefore nitrify 710 kg/d of nitrogen and dentrify 570 kg/d of combined nitrogen in the nitrates. The characteristics of the plants are therefore the following:

| 1 - Plant of a conventional type: | |
| --- | --- |
| anaerobic tank 10 | 5,950 m³ |
| aeration tank 12 | 13,300 m³ |
| clarifier 14 | 3,500 m³ |
| recycle towards the anaerobic tank 10 | 4,750 m³/h |
| (3,550 m³/h originating from the aeration zone 12: recycle R1, FIG. 1) | |

| -continued | |
| --- | --- |
| (1,200 m³/h originating from the clarifier 14: recycle R2, FIG. 1). | |
| 2 - Plant (FIG. 3) using a reactor according to the invention: | |
| anaerobic tank 10 | 4,200 m³ |
| reactor 11 comprising the three zones 16, 18 and 20 | 13,300 m³ |
| clarifier 14 | 3,500 m³ |
| recycle towards the anaerobic tank 10 | 3,000 m³ |
| (1,800 m³/h originating from the aeration zone 16 of the reactor: recycle R'1, FIG. 3) | |
| (1,200 m³/h originating from the clarifier 14: recycle R'2, FIG. 3). | |

It remains obvious that the present invention is not limited to the example of embodiment described and shown but that it includes all its alternative forms.

I claim:

1. Improved reactor for the biological treatment of sewage, for replacing the aeration tank in plants which comprise, in combination, an anaerobic tank in which denitrification takes place, an aeration tank where the nitrification of the effluents by aerobic bacteria is carried out and a final clarifier, wherein said reactor comprises a single tank having three separate zones which are, in the order in which the liquid to be treated passes through them successively:

an aeration zone comprising means for plug flow operation wherein said aeration zone comprises air supply means for enabling a dissolved oxygen content higher than 2 mg per liter to be maintained by aeration;

an anaerobic zone following said aeration zone and being provided with means for stirring using a mechanical stirring system for keeping sludge in suspension and which at its entry and at the exit of the aeration zone, comprises a conduit for the recycling of liquor towards an anaerobic tank which is situated at the head of the plant, upstream of said reactor; and a mixing zone providing adjustable aeration and complete mix operation, comprising circulators for stirring and circulating the flow in said mixing zone, aeration means, means for monitoring the redox potential and servo controlling the aeration means in response to the redox potential, and means for transferring the liquor to a clarifier including an exit orifice opening into said conduit.

2. Reactor according to claim 1 wherein said aeration zone represents from 40 to 70% of the total volume of said reactor, said anaerator zone represents from 2 to 10% of this volume and said mixing zone from 20 to 60% of this total volume.

3. Reactor according to claim 1 wherein said tank has a volume sufficient to result in said biological treatment of said effluent in said reactor within 6 to 15 hours, at the design rate of flow of said effluent through said reactor.

4. Reactor according to claim 1 wherein said mixing zone is separated from said anaerobic zone by a first transverse wall; said mixing zone includes a transverse second wall for providing free end space at ends of channels therein for circulating liquor being treated around said second transverse wall with a speed which is independent of the flow of liquor treated at its exit.

5. Reactor according to claim 4 wherein said mixing zone contains mixing propellers.

* * * * *